H. A. LAYCOCK.
SPEED REGULATOR.
APPLICATION FILED FEB. 6, 1917.

1,334,868.

Patented Mar. 23, 1920.

Inventor:
Harry A. Laycock,
by Albert G. Davis
His Attorney.

UNITED STATES PATENT OFFICE.

HARRY A. LAYCOCK, OF SCHENECTADY, NEW YORK, ASSIGNOR TO GENERAL ELECTRIC COMPANY, A CORPORATION OF NEW YORK.

SPEED-REGULATOR.

1,334,868.  Specification of Letters Patent.  Patented Mar. 23, 1920.

Application filed February 6, 1917. Serial No. 147,015.

*To all whom it may concern:*

Be it known that I, HARRY A. LAYCOCK, a citizen of the United States, residing at Schenectady, in the county of Schenectady, State of New York, have invented certain new and useful Improvements in Speed-Regulators, of which the following is a specification.

My invention relates to electric motors and particularly to automatic speed regulating means therefor. In my former Patent, #1,100,748, issued June 23, 1914, is disclosed and claimed a speed regulator for an electric motor, the operation of which controls the insertion and removal of a resistance in the motor field and which furthermore comprises means whereby the motor starts with the resistance short circuited, and consequently with full field strength. Upon the motor acquiring a predetermined speed, the said means opens the short circuit across said resistance so that subsequently the speed of the motor is controlled by the speed regulator.

The object of my present invention is to provide, in a system of motor speed regulation of the type indicated, means which will act to disconnect the motor from the source of current supply, when the motor, for any reason, acquires a certain undesirable high speed.

Figure 1:
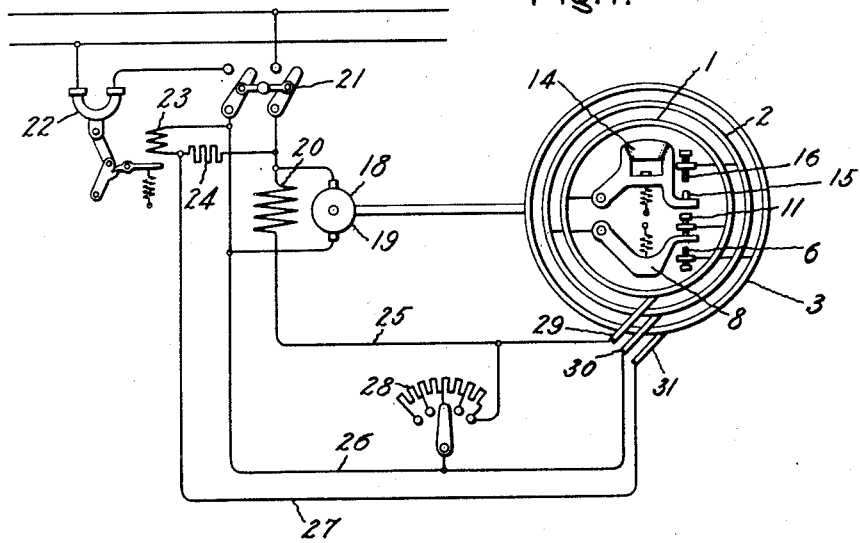
Figure 2:
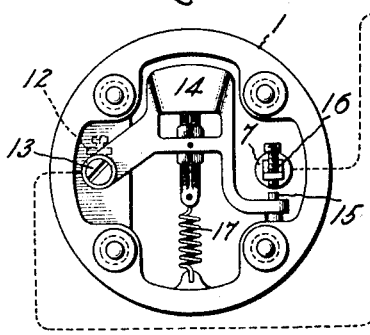
Figure 3:
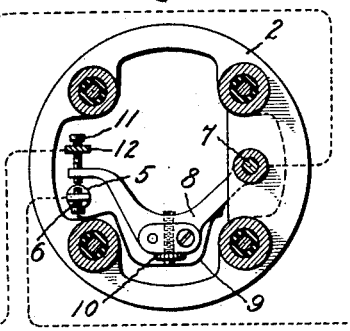
Figure 4:
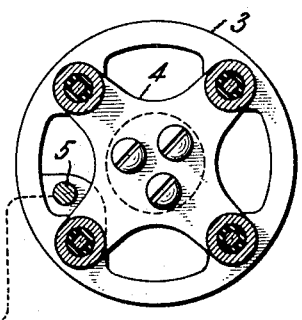
Figure 5:
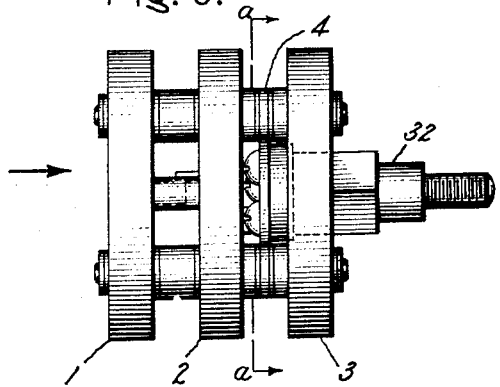
Figure 6:
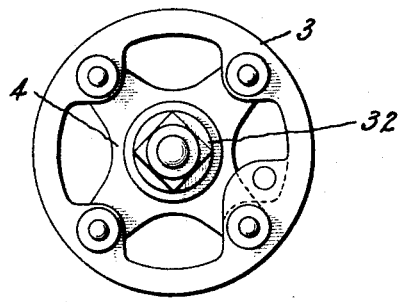

Further objects of my invention will appear from the following description of the structure and mode of operation of the preferred form of my invention which I have illustrated in the accompanying drawings, in which; Figure 1 is a diagrammatic view showing the wiring arrangements of a speed regulator embodying my invention; Fig. 2 is a view of the conducting ring 1, with parts carried thereby, looking in the direction indicated by the arrow in Fig. 5; Fig. 3 is a view of ring 2, with the parts carried thereby, looking in the direction indicated by the arrow in Fig. 5; Fig. 4 is a view taken on the line a—a looking in the direction indicated by the arrow in Fig. 5; Fig. 5 is a side elevation illustrating the assembly of the conducting rings 1, 2 and 3 upon the stub shaft by which they are carried; and Fig. 6 is a view of conducting ring 3, the stub shaft by which the conducting rings are carried, and the spider by which the conducting rings are attached to said shaft, looking in a direction opposite to that indicated by the arrow in Fig. 5.

Referring first to Figs. 2 to 6 inclusive, 1, 2 and 3 are conducting rings secured to, but insulated from, each other. By means of the spider 4 said rings are rigidly secured to the stub shaft 32 which, in turn, is adapted to be attached to the shaft of the motor, the speed of which is to be regulated. The conducting ring 3 carries, and is electrically connected to, the stud 5 to one end of which is secured an adjustable contact 6 which is adapted to be engaged by a contact carried by the centrifugal member 8 which is pivotally mounted upon the stud 7 which is secured to, and has electrical connection with, the conducting ring 2, and is provided at one end with an adjustable contact 16. A spring 9, the tension of which may be adjusted by the thumb screw 10, is attached at one end to the centrifugal member 8 and acts to oppose the movement of said member 8 under the action of centrifugal force. Said centrifugal member carries a contact which is adapted to engage with a contact 11 which is adjustably mounted in the support 12. Support 12 is mechanically and electrically connected to the bolt 13 which is carried by the conducting ring 1 and serves as a pivot for the centrifugal member 14. The bolt 13 is electrically connected both to the ring 1 and member 14. Said centrifgual member is provided with a contact 15 adapted to engage with the contact 16, adjustably mounted on the member 7. Adjustable means including the spring 17 is employed to oppose the movement of the centrifugal member 14, under the action of centrifugal force.

Referring to Fig. 1, in which the connections between the controlling device above described and the motor and supply circuit are illustrated, the motor 18 having an armature 19 and a field winding 20 is connected to the source of current supply by means of the switch 21 and the circuit breaker 22. The operation of the circuit breaker is controlled by means of the winding 23 which is connected, in series with the resistance 24, across the motor terminals. So long as the winding 23 is energized, the circuit breaker 22 will remain closed, but upon the winding 23 becoming deënergized, in a manner hereinafter described, said circuit breaker will be opened and hence the supply of current to the motor discontinued.

According to the showing of Fig. 1, the speed regulating device is secured directly to the motor shaft and the conducting rings 1, 2 and 3 are respectively connected by means of the brushes 29, 30 and 31 and the leads 25, 26 and 27, to one terminal of the field winding, to one terminal of the armature, and to a point intermediate the winding 23 and the resistance 24. An adjustable resistance 28 is connected across the leads 25 and 26.

The operation of the system is understood to be as follows: Let it be assumed that the motor is at a standstill. The contact 11 will, in this event, be engaged by a contact carried by the centrifugal member 8, by reason of the action of the spring 9 upon said centrifugal member and consequently the resistance 28, which is connected across the leads 25 and 26, will be short circuited, since, under the conditions named, conductor rings 1 and 2 will be electrically connected. Upon closing the switch 21 the motor starts with full field. Upon the speed of the motor reaching a predetermined value the centrifugal member 8 will overcome the effect of spring 9 and open the short circuit around the resistance 28. The field of the motor will then be weakened and hence the motor will accelerate to higher speeds. When the speed of the motor reaches a predetermined value, the centrifugal member 14 will overcome the tension of the spring 17 and cause the contact 15 to engage with contact 16, whereupon the conducting rings 1 and 2 are electrically connected. The resistance 28 will therefore be again short circuited and the field of the motor will consequently tend to strengthen to its full value. Upon the strengthening of the motor field, however, the speed of the motor will decrease, whereupon the contacts 15 and 16 will be disengaged and consequently the electrical connection between the conducting rings 1 and 2 will be broken. This results in a weakening of the motor field, with a consequent increase in motor speed. This alternate opening and closing of contacts 15 and 16 will continue with the result that the speed of the motor will be maintained substantially constant. If, however, the speed of the motor should increase for any reason to a certain higher predetermined value, the contact carried by the centrifugal member 8 will be caused to engage with the contact 6, whereupon the conducting rings 2 and 3 are electrically connected. This results in short circuiting, and hence in de-energizing, the winding 23. The circuit breaker 22 will thereupon be tripped and the motor disconnected from the speed circuit.

I conceive that various modifications of my invention may be made and I accordingly do not desire to be limited to the exact arrangement shown, but seek to cover, in the appended claims, all such modifications and arrangements as fall within the scope and spirit of my invention.

What I claim as new and desire to secure by Letters Patent of the United States, is:—

1. In combination, a motor, a source of electrical energy therefor, and means for controlling the operation of said motor comprising a plurality of collector rings and a speed responsive circuit closing means connected to rotate with said motor, certain of said collector rings coöperating with said circuit closing means for varying the speed of said motor and certain of said collector rings coöperating with said circuit closing means for disconnecting the motor from said source at a predetermined speed.

2. In combination, a motor, a source of electrical energy therefor, and means for controlling the operation of said motor comprising a plurality of collector rings and a plurality of centrifugal circuit closing members connected to rotate with said motor, one of said members being arranged to coöperate with certain of said collector rings to vary the speed of said motor and another of said members being arranged to coöperate with certain of said collector rings to vary the speed of said motor and to coöperate with other of said collector rings to disconnect the motor from said source at a predetermined speed.

3. In combination, a motor having a field winding, a source of electrical energy therefor, and means for controlling the operation of said motor comprising a resistance in series with said field winding, a plurality of collector rings, and a plurality of centrifugal circuit closing members connected to rotate with said motor, certain of said rings coöperating with one of said members to short circuit said resistance when the motor speed is below a predetermined value and coöperating with another of said members to short circuit said resistance when the motor speed is above a predetermined value and certain of said rings coöperating with the first mentioned member to disconnect the motor from said source at a predetermined speed.

4. The combination with a source of electrical energy and a motor adapted to be connected thereto, of speed regulating means for said motor comprising a resistance in series with the field winding, a rotating element operatively related to the rotating member of said motor, a spider carried by said rotating element, a plurality of insulated collector rings mounted upon said spider, one pair of said collector rings being so connected to said resistance that, upon being electrically connected to each other, said resistance is short circuited, a centrifugal member electrically connected to, and pivotally mounted upon, one ring of said pair and provided with a contact adapted to engage with a contact carried by, and electrically connected to, the other ring of said pair to short circuit said resistance at a predetermined motor speed, a centrifugal member electrically connected to, and pivotally mounted upon, the second ring of said pair and provided with a pair of contacts, one of which is adapted to engage with a contact carried by, and electrically connected to, the first ring of said pair to short circuit said resistance when the motor speed is below a predetermined value, and the other of which is adapted to engage with a contact carried by, and electrically connected to, a third collector ring when the motor speed attains a predetermined value, and means electrically connected to the second ring of said pair and the third ring and adapted upon engagement of the last named contacts to disconnect the motor from the source of energy.

5. The combination with a source of electrical energy and a motor adapted to be connected thereto, of speed regulating means for said motor comprising a resistance in series with the field winding, a rotating element operatively related to the rotating member of said motor, a spider carried by said rotating element, a plurality of insulated collector rings mounted upon said spider, a centrifugal member electrically connected to, and pivotally mounted upon, one of said rings, a contact carried by said centrifugal member and adapted to coöperate with a contact carried by, and electrically connected to, a second collector ring, a centrifugal member electrically connected to, and pivotally mounted upon, said second collector ring, a pair of contacts carried by the second named centrifugal member and adapted to coöperate, respectively. with a contact carried by, and electrically connected to, the first named collector ring and a contact carried by, and electrically connected to, a third collector ring, the first and second named collector rings being electrically connected to the terminals of said resistance, and a circuit interrupter electrically connected to the second and third named collector rings and adapted upon the engagement of a contact carried by the second named centrifugal member with the contact carried by the last named collector ring to disconnect the motor from the source of energy.

In witness whereof, I have hereunto set my hand this 5th day of February, 1917.

HARRY A. LAYCOCK.